(12) United States Patent
Matula

(10) Patent No.: US 8,202,397 B2
(45) Date of Patent: *Jun. 19, 2012

(54) METHOD OF AND AN ARRANGEMENT FOR PROPORTIONING THICK STOCK TO A SHORT CIRCULATION OF FIBER WEB MACHINE

(75) Inventor: Jouni Matula, Savonlinna (FI)

(73) Assignee: Wetend Technologies Oy, Savonlinna (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/735,856

(22) PCT Filed: Feb. 19, 2009

(86) PCT No.: PCT/FI2009/050137
§ 371 (c)(1),
(2), (4) Date: Aug. 20, 2010

(87) PCT Pub. No.: WO2009/103853
PCT Pub. Date: Aug. 27, 2009

(65) Prior Publication Data
US 2011/0011548 A1 Jan. 20, 2011

(30) Foreign Application Priority Data
Feb. 22, 2008 (FI) .................................... 20085166

(51) Int. Cl.
*D21H 11/00* (2006.01)
(52) U.S. Cl. .................................................. 162/181.4
(58) Field of Classification Search ............... 162/181.4, 162/100, 158, 380, 199
See application file for complete search history.

(56) References Cited

U.S. PATENT DOCUMENTS

| | | | | |
|---|---|---|---|---|
| 4,911,790 A | * | 3/1990 | Lindstrom et al. | 162/175 |
| 6,267,845 B1 | * | 7/2001 | Hautala et al. | 162/183 |
| 6,551,459 B1 | * | 4/2003 | Lumiala et al. | 162/198 |
| 6,740,198 B2 | | 5/2004 | Ahola et al. | |
| 7,234,857 B2 | * | 6/2007 | Matula | 366/167.1 |
| 7,407,563 B2 | * | 8/2008 | Hietaniemi | 162/264 |
| 7,566,382 B2 | * | 7/2009 | Hietaniemi | 162/198 |
| 2002/0060026 A1 | * | 5/2002 | Huovila et al. | 162/258 |
| 2002/0131325 A1 | | 9/2002 | Matula | |
| 2004/0182535 A1 | * | 9/2004 | Hietaniemi et al. | 162/336 |
| 2004/0238140 A1 | * | 12/2004 | Laitinen-Vellonen | 162/198 |

(Continued)

FOREIGN PATENT DOCUMENTS

EP 1102887 8/2004

(Continued)

OTHER PUBLICATIONS

International Search Report for PCT/FI2009/050137, mailed Aug. 18, 2009.

(Continued)

*Primary Examiner* — Mark Halpern
(74) *Attorney, Agent, or Firm* — Nixon & Vanderhye P.C.

(57) ABSTRACT

The present invention relates to a method and an arrangement for proportioning thick stock to a short circulation of a fiber web machine. Specifically, the method and the arrangement of the invention relate to treating and proportioning thick stock components of paper making stock having a consistency of the order of 2-12%, preferably 2-5%, for instance into white water one component after another alone or together with an additive.

17 Claims, 7 Drawing Sheets

U.S. PATENT DOCUMENTS

Figure 1:
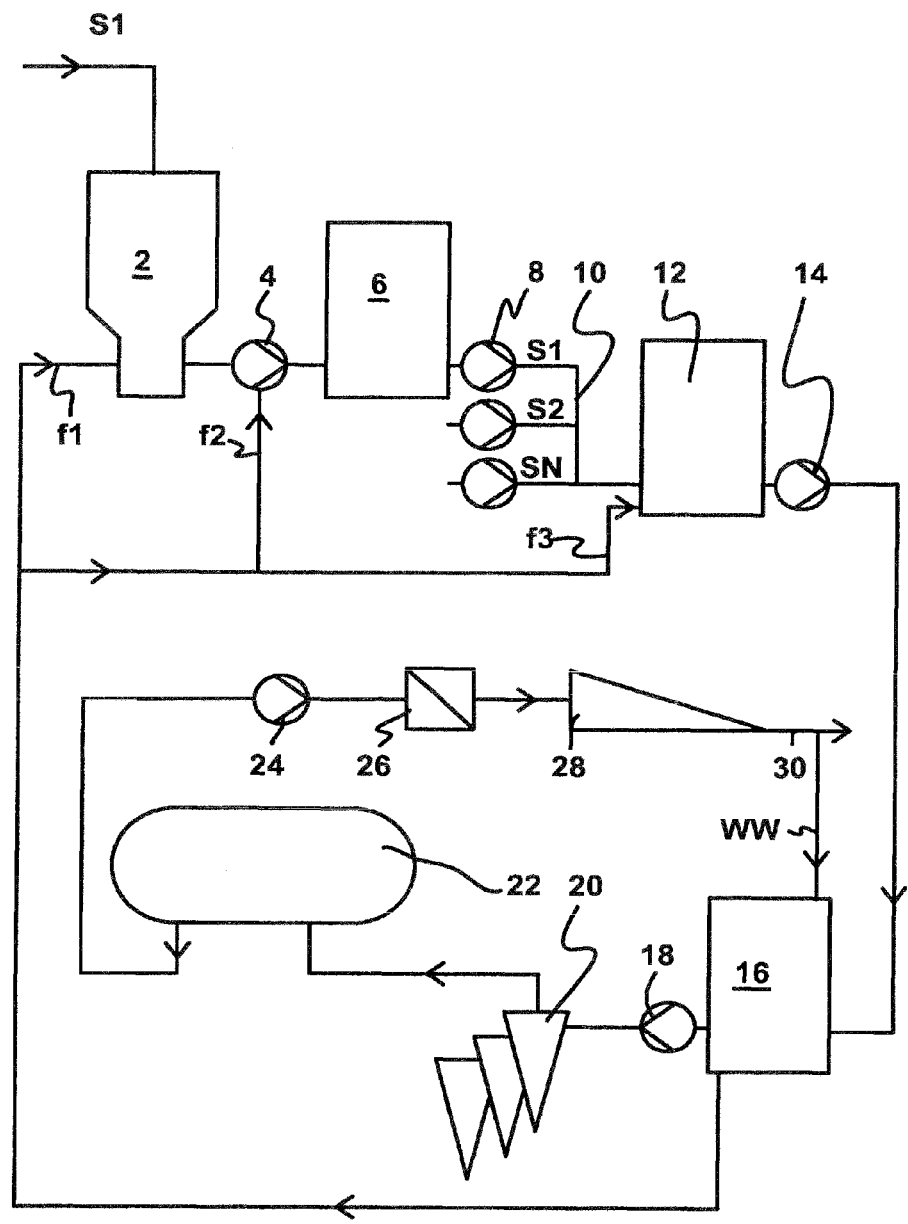

2005/0224204 A1* 10/2005 Hietaniemi .................. 162/198
2011/0000633 A1* 1/2011 Kukkamaki et al. ....... 162/181.2

FOREIGN PATENT DOCUMENTS

| FI | 113971 | 7/2004 |
|----|--------|--------|
| WO | 99/64666 | 12/1999 |
| WO | WO 02/25012 | 3/2002 |
| WO | 2006/117435 | 11/2006 |

OTHER PUBLICATIONS

Written Opinion of the International Searching Authority for PCT/FI2009/050137, mailed Aug. 18, 2009.

International Preliminary Report on Patentability for PCT/FI2009/050137, (Dec. 17, 2009), 13 pages.

* cited by examiner

METHOD OF AND AN ARRANGEMENT FOR PROPORTIONING THICK STOCK TO A SHORT CIRCULATION OF FIBER WEB MACHINE

This application is the U.S. national phase of International Application No. PCT/FI2009/050137 filed 19 Feb. 2009 which designated the U.S. and claims Priority to FI Application No. 20085166 filed 22 Feb. 2008, the entire contents of each of which are hereby incorporated by reference.

The present invention relates to a method of and an arrangement for proportioning thick stock to a short circulation of a fiber web machine. Specifically, the method and the arrangement of the invention relate to treating and proportioning thick stock components of papermaking stock having a consistency of the order of 2-12%, preferably 2-5%, for instance into white water one component after another alone or together with an additive.

Paper or, more generally speaking, fiber web is manufactured by using many different types of fiber components. Examples of such are chemical pulp, chemi-mechanical pulp, mechanical pulp, recycled pulp and broke. Furthermore, various fillers and additives as well as various filtrates from the fiber web machine and solids separated therefrom are used for the manufacture of fiber web.

Most of the stock components mentioned hereinabove are retained in storage towers, from which they are proportioned either directly or through a special dosing tank further to a mixing tank, in which the stock components are mixed with each other. From the mixing tank the stock having a consistency of about five per cent is passed into a machine chest, in which the stock is diluted to a consistency of about three per cent. From the machine chest, the stock is passed into a wire pit, in which the filtrate from the wire section of the fiber web machine is collected and in which the stock is diluted to a headbox consistency, which is about 0.5-1%.

It has been a long-range goal in the paper industry to simplify the stock treating process and, especially, to decrease tank volumes before the proportioning to the paper machine. An aim has been to combine the mixing tank and the machine chest, and also to decrease the volume of the remaining machine chest.

This has been done, e.g., in the processes described in patent publications WO-A1-99/64666, U.S. Pat. No. 6,740,198 B2, WO-A1-2006/117435 and EP-B1-1102887.

WO-A1-99/64666 teaches mixing of fresh stock with water in order to dilute stock to a headbox consistency. In the arrangement according to the publication, fresh stock is introduced, together with the water coming from the return circulation, into pipes arranged inside each other to the outlet end of the wire pit, at which point the three flows are united and mixed with each other, as a result of both a special form of the cross section of the pipes and the following pump.

U.S. Pat. No. 6,740,198 B2 teaches a type of mixing arrangement similar to the one described hereinabove, in which the outer tube transporting a first pulp component contains several inner tubes which lead to a mixing point whereto said inner tubes open. The inner tubes bring other pulp components, additives, dilution liquid etc. to the mixing point. Mixing of the pulp components is contributed by turbulence means arranged both in the outer tube and in connection with the end openings of the inner tubes.

WO-A1-2006/117435 teaches a mixing device for mixing a plurality of liquids with each other. Said mixing device comprises a plurality of conical chambers. The more converged end of each chamber forms an open end and the liquid to be mixed is fed tangentially to an opposite end. Such conical chambers are connected axially one after another around a stationary centre shaft of the mixer in such a manner that the flow being discharged from the end opening of the chamber starts passing spirally around said centre shaft. As the chambers are connected one after another around the same shaft, also the end openings are positioned one after another so that the flow being discharged from each opening falls on top of the flow being discharged from the preceding opening. As the inlet ducts of said chambers are arranged tangentially in the opposite directions, it is possible to considerably intensify the mixing effect because the circulation directions of the liquid in adjacent chambers are opposite to each other. In the arrangement according to the publication, the fiber suspension formed of several fiber components by means of a mixing device of this type is passed through one flow tube into white water, to be further diluted to a headbox consistency.

EP-B1-1102887 teaches a process arrangement of a paper machine short circulation, in which arrangement each of the different partial stocks forming the papermaking stock is stored in a storage tower of its own, from which storage towers the partial stocks are pumped to proportioning tanks, and each of them is then further pumped by a dosing pump of its own to a closed mixing space. In the mixing space, partial stocks are mixed with each other and diluted to a stock of a suitable consistency, to form a papermaking stock, so that the papermaking stock is capable of being pumped by a feed pump of the main line of the process, through a machine screen, to a headbox, or by a first feed pump, through a screening device and vortex cleaning, to a second dilution stage and further therefrom by a second feed pump through the machine screen to a headbox. The publication teaches in principle two different types of proportioning. In the first option, each thick stock component is pumped separately into a filtrate circulated through a deaeration tank, and in the second option, thick stock fractions are first pumped to one flow and only after that they are combined with the filtrate coming from the wire section of the paper machine.

In the short circulation arrangements of all publications cited hereinabove, which are slightly more advanced than conventional arrangements, the problem to be solved is sufficient mixing of stock components prior to the headbox of the paper machine. The publications seek the solution to the problem in different manners. In the first two publications, it is believed that the static mixing means arranged in the flow piping and the feed pump are sufficient means to ensure efficient mixing. In the third publication, the structure of the mixing means which is static as such has been developed in order to achieve more efficient mixing. It is our understanding that all short circulation arrangements handled hereinabove are, however, featured by the need for at least one, probably several pumps between the actual mixing point of the thick stock components and the headbox. Freedom to optimize the short circulation of the paper machine is considerably restricted by this demand.

F-B-113971 teaches a paper machine approach system in which the thick stock components to be introduced into the paper machine have been divided into two groups, based on whether it is necessary to handle the stock component to be fed to the paper machine in a vortex cleaning plant or not. In other words, vortex cleaning is used for, e.g. stock from the broke line or for some other stock which has not vortex cleaning in its preparation line. Vortex cleaning is bypassed, for example, by cellulose pulp, recycled pulp or thermomechanical pulp because their production lines are conventionally provided with a vortex cleaning stage. In the cited patent, the only starting point has been the observation that during their preparation, part of the thick stock components has already been treated by vortex cleaning devices, and therefore feeding them to the vortex cleaning plant of the paper machine short circulation is in practice unnecessary. Thus, the object of the invention disclosed in the patent publication is optimization of the size of the vortex cleaning plant.

An object of the present invention is to eliminate weaknesses of the prior art arrangements described hereinabove and, by applying injection feed technique, such as e.g. Wetend Technologies Oy's TrumpJet™ technology, to introduce thick stock components independently as such to the paper machine and to mix and dilute them, for example, into white water, one or more components at a time. Components are, for example, long and short fibre of chemically prepared pulp, mechanical pulp, recycled fibre, broke pulp and return fraction from the fiber recovery. Typically, the number of fractions at a paper machine is 3 ... 5.

Another object of the present invention is, among other things, to decrease the number and/or volume of various chests related to the process.

A third object of the present invention is to further simplify the short circulation of the paper machine by using arrangements, by means of which the approach piping of the paper machine needs substantially less changes than if arrangements of the prior art described hereinabove were used.

A fourth object of the present invention is to optimize the feed of thick stock components so that it is possible to feed each component to an optimal point of the short circulation.

The above objects of the present invention are achievable e.g. by the method in accordance with the invention of proportioning thick stock into the short circulation of a fiber web machine, the method being characteristic of at least one of the thick stock components being introduced into the short circulation of the fiber web machine by injecting.

Objects of the present invention are also achievable by means of the arrangement in accordance with the invention for proportioning thick stock to the short circulation of a fiber web machine, which arrangement comprises a plurality of proportioning tanks for thick stock components, said proportioning tanks being connected through flow paths to the main pipeline of the short circulation, which arrangement is characteristic of being further provided with a injection feed means for thick stock components said injection feed means being arranged in at least one of said flow paths and connecting said flow path to the main pipeline.

Other characteristic features of the present method and arrangement in accordance with the invention are disclosed in the attached claims.

By using the method and arrangement in accordance with the invention, e.g., the following advantages are achievable:
It is possible to omit the proportioning tank.
It is possible to either leave out the mixing tank altogether, combine it with the machine chest, or at least decrease its volume.
It is possible to either totally give up the machine chest or at least decrease its volume.
As the tank volumes decrease or the tanks are totally omitted, considerable savings in space are achieved.
A special mixing device can be totally eliminated.
Decrease of tank volumes in any manner leads to shorter stock change times, which increases the efficient runtime of the paper machine.
Thick stock components can be run to a point which is optimal for them in the short circulation.
The stock components treated already in the vortex cleaning need not be taken to a cleaning stage again, the size of the vortex cleaning plant decreases because all the stock going to the paper machine need not be run through the vortex cleaning plant.
In the same way, if it is evaluated that some thick stock component need not be used in the deaeration, it may be introduced after the deaeration device into the main stock flow.
At the same time, the runnability of the short circulation and the whole paper machine and the process control becomes easier.
When a new mill is built or existing paper machinery is transferred, e.g., to a new site, remarkable savings of cost are achieved.
The order and position of proportioning can be selected freely.
As it is possible to select an optimal additive for each position, it is also possible to influence on the flock structures, bonding of fines, etc.
As it is possible, if so desired, to direct each additive to the stock fraction of its own, it is also possible to influence on dewatering, web formation, cleanliness, effect of chemicals, sizing result, opacity, printability, etc.

Figure 2:
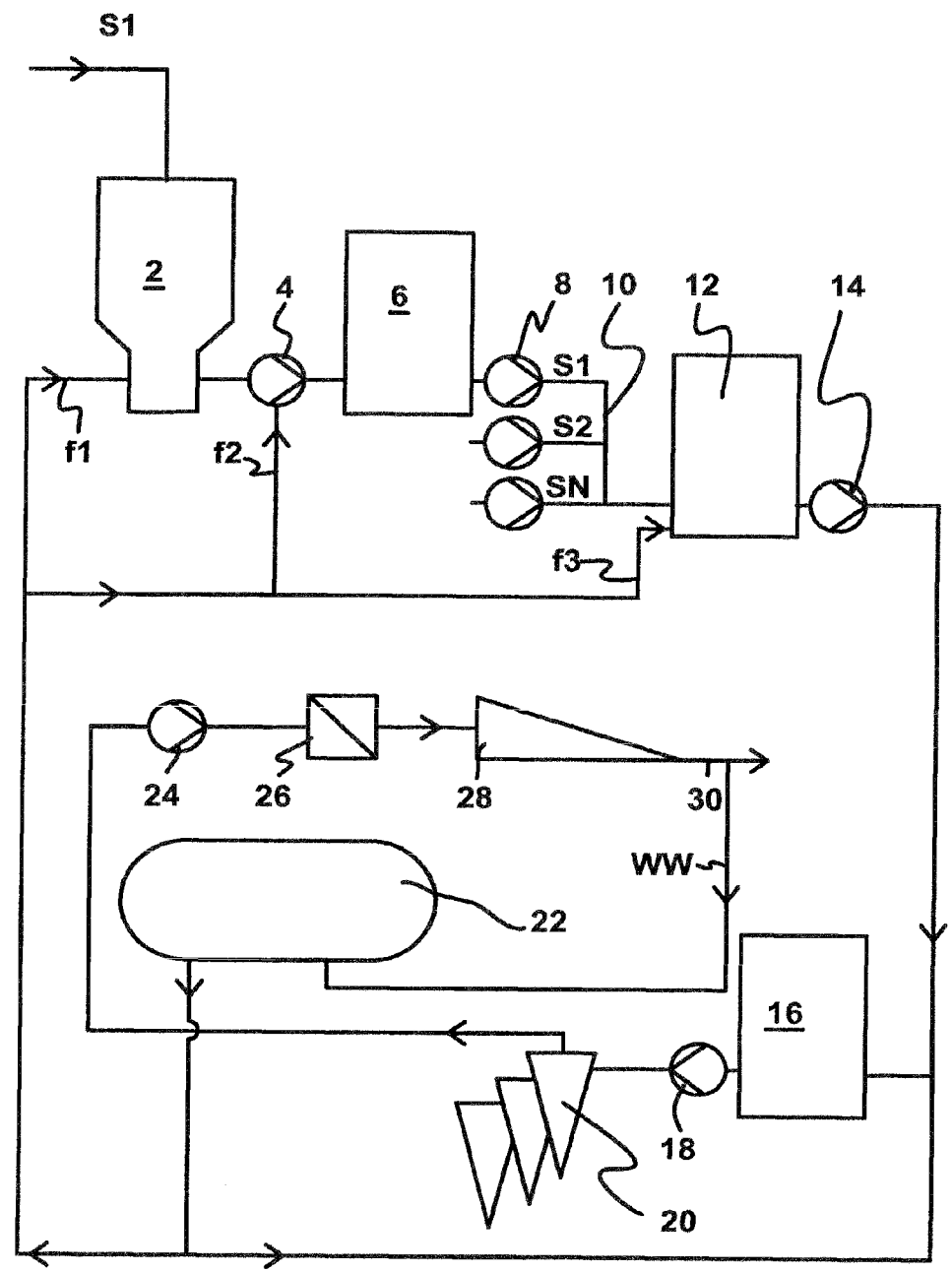
Figure 3:
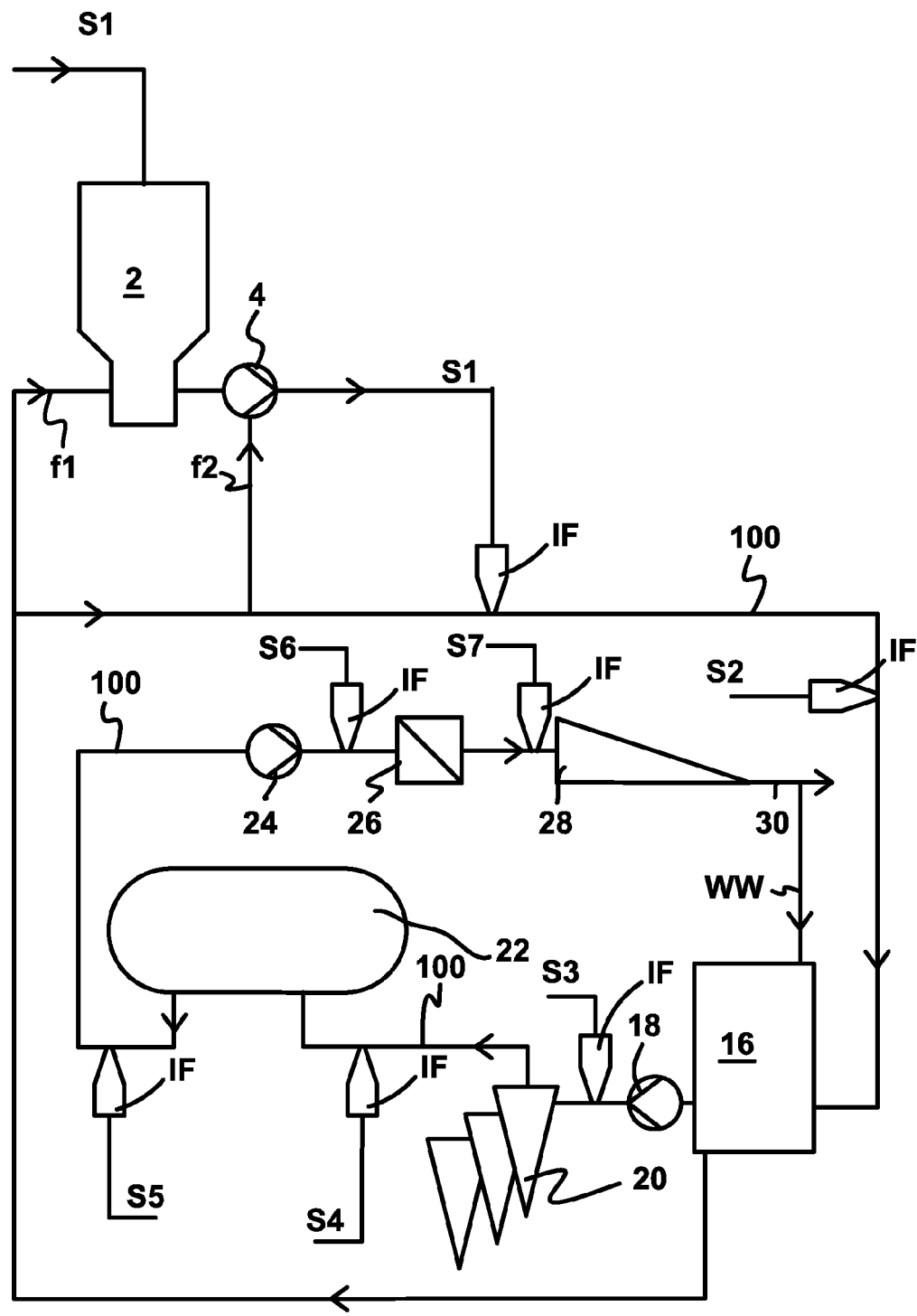
Figure 4:
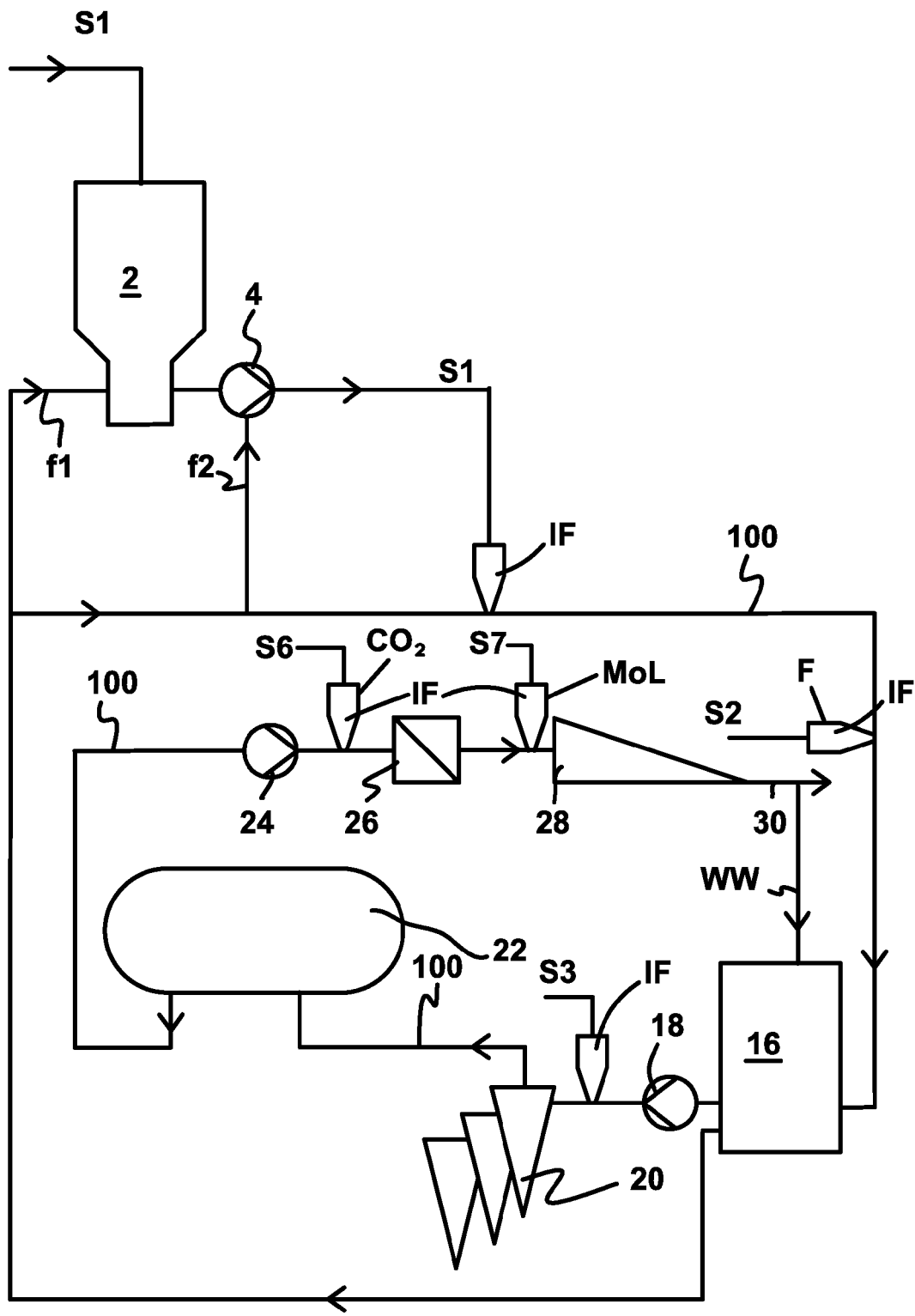
Figure 5:
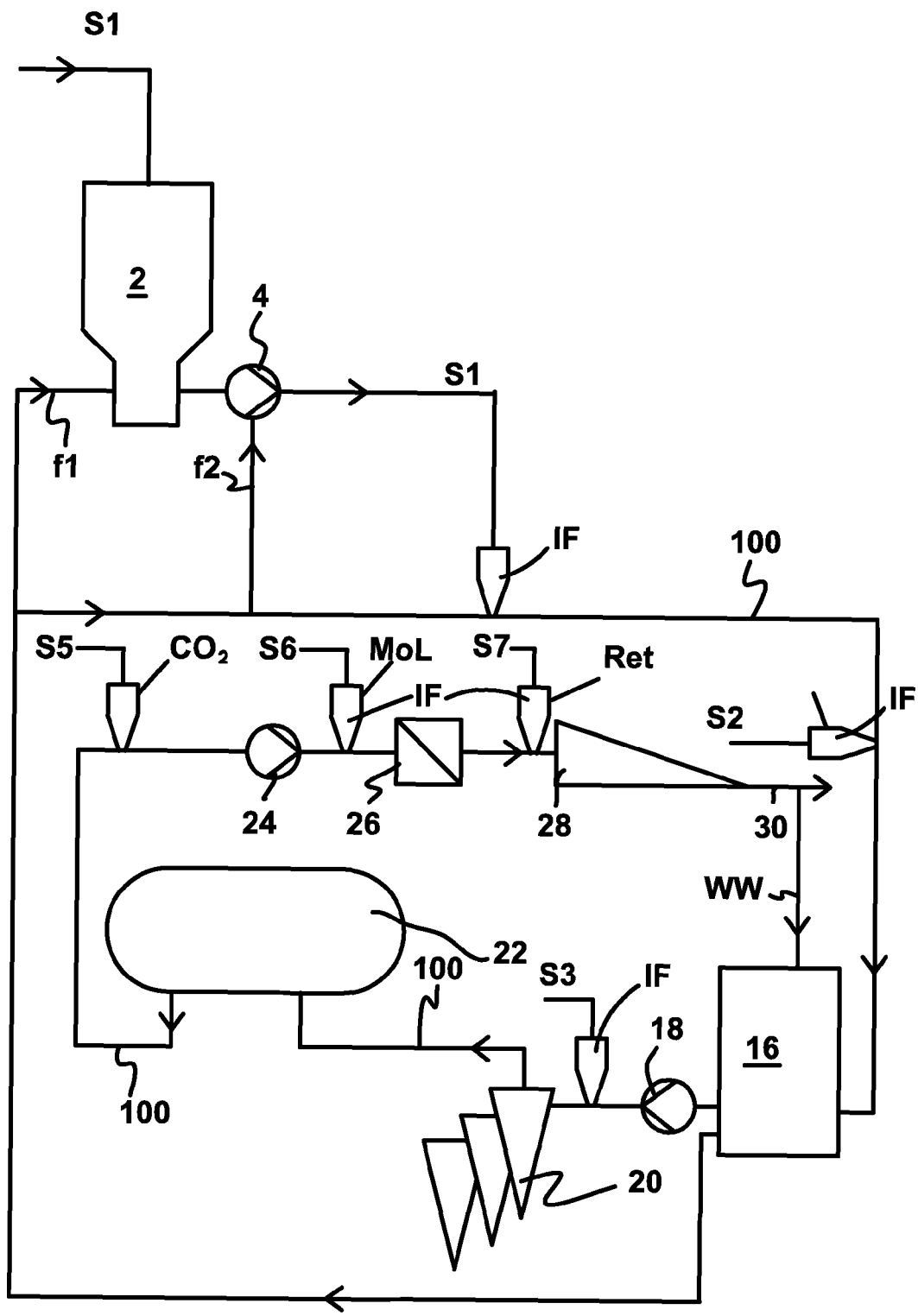
Figure 6:
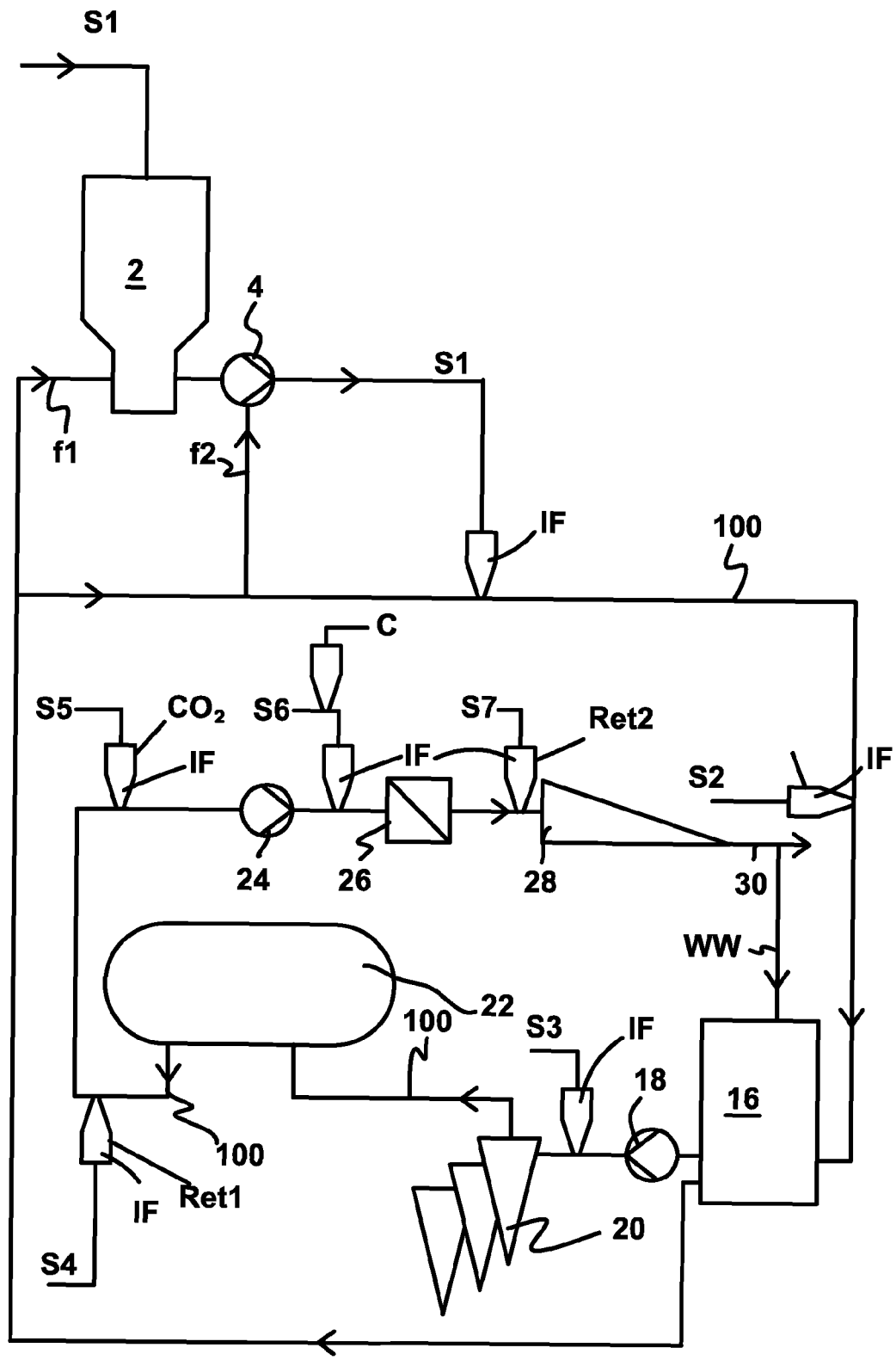
Figure 7:
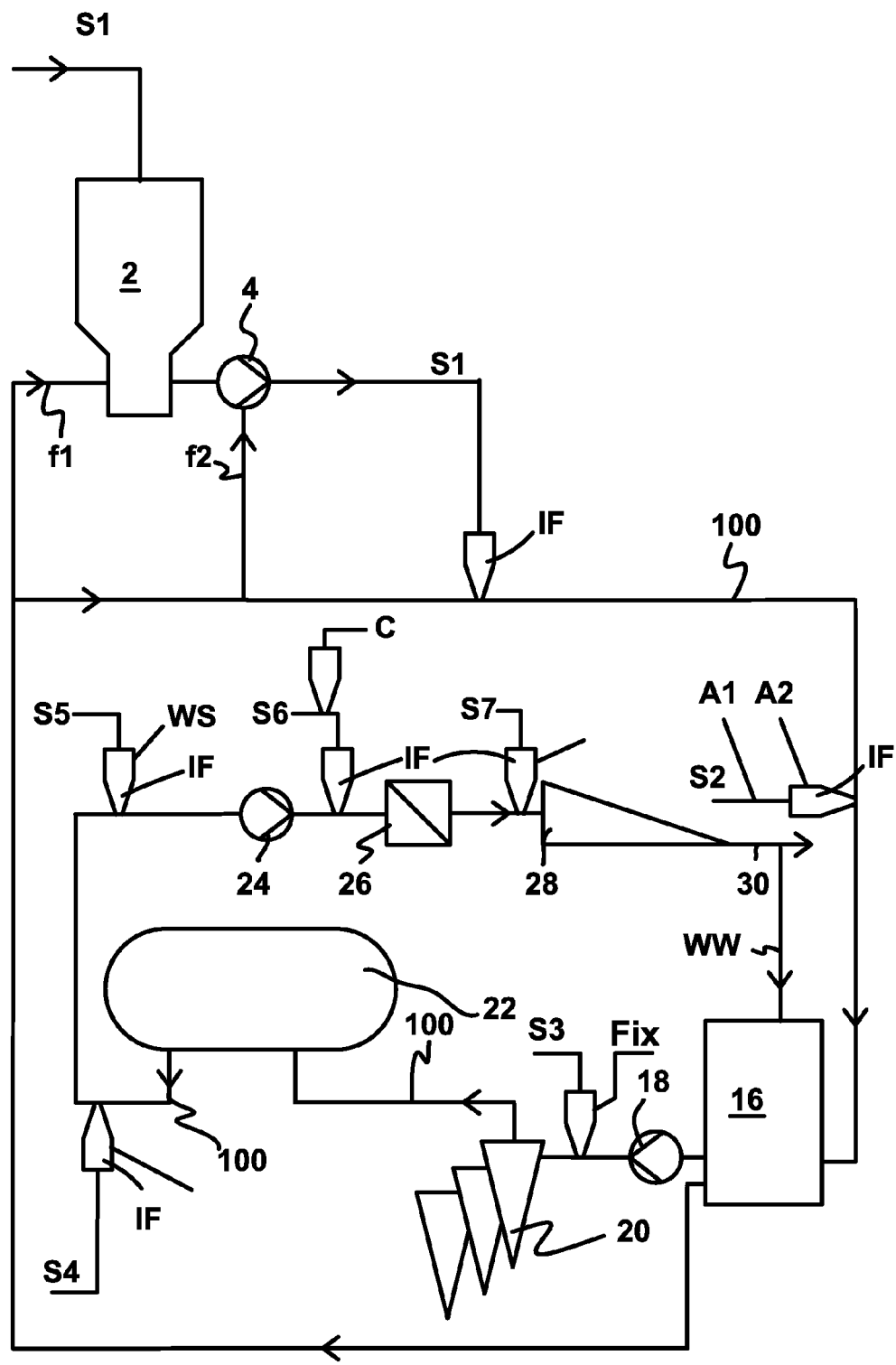

The method and arrangement according to the present invention are described further in detail in the following, with reference being made to the accompanying drawings, in which FIG. 1 is schematic illustration of an approach system of a paper machine or a so-called short circulation, in accordance with prior art, FIG. 2 is a schematic illustration of a second approach system of a paper machine or a so-called short circulation, in accordance with prior art, FIG. 3 is a schematic illustration of an approach system of a paper machine, in accordance with a preferred embodiment of the invention, FIG. 4 is a schematic illustration of an approach system of a paper machine, in accordance with a second preferred embodiment of the invention, FIG. 5 is a schematic illustration of an approach system of a paper machine, in accordance with a third preferred embodiment of the invention, FIG. 6 is a schematic illustration of an approach system of a paper machine, in accordance with a fourth preferred embodiment of the invention, and FIG. 7 is a schematic illustration of another approach for adding both thick stock components and additives needed for the forming of the fiber web to the short circulation of the fiber web machine.

In the schematic illustration of FIG. 1 of a process arrangement of a short circulation of a paper machine in accordance with conventional technique, reference number 2 denotes a storage tank or a storage tower for a thick stock component S1, wherefrom said component is pumped with a first pump 4 to a proportioning tank 6. Said thick stock component S1 is diluted in the lower section of the storage tower 2 by means of dilution water flow f1 introduced thereinto. Next, the consistency of the thick stock component is lowered, or at least it is possible to lower it by introducing a dilution water flow f2 to the first pump 4. The short circulation is provided with as many proportioning tanks 6 and storage towers 2 as the number of thick stock components S. Each stock component is led from its proportioning tank 6 by a second pump 8 to a mixing tank 12, either separately or all components passed to the main process line 10 leading to the mixing tank 12. FIG. 1 shows several adjacent pumps 8 for the described purpose, in other words to feed stock components S ... SN, which are already partially diluted, to the main line 10. It is possible to introduce into the mixing tank 12 also other substances needed in the papermaking process, such as fillers or retention aids. In the mixing tank 12, the stock components are mixed and fed by means of a third pump 14 to a machine chest (not disclosed). From the machine chest, so-called machine stock is led to the wire pit 16. The mixing tank 12, machine chest and wire pit 16 form an equalizing unit for stocks, and in them, the pulp is diluted by liquids f3 and WW to the final dosing consistency. From the wire pit, the so-called machine stock is introduced with a fourth pump 18 into the short circulation of the paper machine.

In the short circulation, said machine stock is first taken to a vortex cleaning plant 20, to be vortex cleaned, in which process heavier particles are separated from the paper stock. The accept from the vortex cleaning plant 20 continues to a deaeration tank 22, in which air or possibly other gas is removed from the stock by means of vacuum, so that it would not hamper the papermaking process. From the deaeration tank 22, the stock flows to a feed pump 24 of the headbox, which pumps stock to a so-called headbox screen 26, in which particles too large for the papermaking are separated from the stock and the accept fraction of which is led to the paper machine through the headbox thereof 28. From the headbox 28, stock continues to the wire section 30 of the paper machine, in which liquid WW is drained therefrom in connection with web forming. This so-called white water WW is, as shown in FIG. 2, passed to the wire pit, wherefrom it is possible to recirculate it to be reused in different stages of the process, as dilution water f1 . . . f3. In some fiber web machines which prepare less exacting end products, the short circulation may not include the vortex cleaning plant, deaeration and/or headbox screen, at all. Furthermore, in some applications deaeration is not taken care of by vacuum tanks, but with a special device in which the separation is based on centrifugal force.

Prior art publications also disclose paper machine approach systems in which, as shown in FIG. 2, the white water WW coming from the web formation is passed directly to a deaeration tank, and so substantially gasfree filtrate may be used for the dilution of thick stock components. In other words, when free air contained in the filter is removed and when it is assumed that thick stock components do not contain air to a harmful extent, it is not necessary to circulate the actual papermaking stock via deaeration. For the rest of its essential parts, FIG. 2 corresponds to FIG. 1, so a more detailed explanation thereof is not necessary.

FIG. 3 is a schematic illustration of practically all those positions to which it is possible to inject one or more thick stock components. In other words, FIG. 3 indicates how a thick stock component S1 issued from the storage tower 2 is diluted with a filtrate f1 or a so-called white water in the storage tank 2 and, if needed, also with a filtrate f2 while it is pumped with the pump 4 to an injection feed device IF, by which the diluted stock component S1 is injected to a main stock line 100, in which only white water WW or equivalent coming from the wire pit 16 is flowing so far, which white water may come directly from the wire section 30 of the paper machine or treated by the deaeration device, as shown in FIG. 2. Another possible feeding point (S2) is the same main stock line a little later. The purpose of using these two apparently successive feeding points, is to point out the fact that it is possible to introduce thick stock components by injection means either to positions which are in immediate succession or to positions whose distance between which is such that, for example, the first thick stock component has possible had time to form desired flocks under an influence of a chemical or additive possibly fed with it, before feeding of another thick stock component. Naturally, also other reasons may be found for feeding two thick stock components separately, as shown in FIG. 3.

Next, either just before or just after the feed pump 18 of the vortex cleaning plant 20, it is possible to inject a thick stock component (S3) with an injection feed device IF to the main stock line 100, said thick stock component having preferably been diluted and pumped from the storage tower of its own, in the same way as the first thick stock component. After the vortex cleaning plant 20, but prior to the deaeration 22, it is also possible to inject a thick stock component (S4). Stricter demands on cleanliness have to be naturally set on this and other components as compared with the earlier ones (S1-S3) because these components do no longer pass through the vortex cleaning. Usually stock which has already gone through the vortex cleaning in its own manufacture is injected to this and later positions. The next possible point of injection (S5) of a thick stock component is an injection feed device IF positioned prior to the headbox feed pump 24. The next possible thick stock component S6 may be fed between the headbox feed pump 24 and the headbox screen 26 with an injection feed device IF. The last possible injection position S7 is naturally the part of the main stock line which is between the headbox screen and the headbox.

The feeding positions shown in FIG. 3 show clearly how by using an injection feed device, it is possible to feed thick stock components to any point of the main stock line of the short circulation. Whether any of the stock components is fed before or after a pump has barely no significance because, e.g., Wetend Oy's TrumpJet™ injection feed devices are capable of both feeding the thick stock component to the pressure side of the pump and mixing the stock component efficiently into the stock flowing in the main stock line so that the mixing effect of the pump need not necessarily be utilized. The injection feed device specifically means a device which feeds a first medium into a second medium in a substantially transverse direction relative to the direction of flow of the second medium. By the above mentioned term "substantially transverse direction" we understand a direction which deviates more than 30 degrees from the direction of flow of the second medium flowing in the flow pipe. By injecting we further understand introducing of a first medium into a second medium in such a manner that the medium being injected has a substantially higher velocity than the second medium, whereby the first medium dissolves in the second medium in the form of a fan-shaped jet and achieves a predetermined depth, irrespective of turbulence possibly prevailing in the second medium or of lack thereof. Now, by arranging for example four injection feed devices on the circle of the flow pipe transporting the second medium, it is possible to cover practically the whole cross-sectional area of the flow pipe with the jets of these injection feed devices. The feed rate of the first medium in the injection is preferably of the order of 3-15, preferably 5-10 times the rate of the second medium.

A characteristic feature of the present invention is that the thick stock component injected according to the invention has always a higher consistency than the suspension into which said thick stock component is introduced. Naturally, the starting point is that the first thick stock component, the consistency of which is of the order of 2 . . . 12%, is introduced into white water, the consistency of which is parts of a percent.

FIG. 3 illustrates a preferred embodiment of the invention, showing how introduction of different thick stock components is arranged on different sides of the vortex cleaning. However, it is not necessary to act in this way, but it is also possible to effect vortex cleaning for the whole amount of diluted stock, in which case all thick stock components are injected prior to the vortex cleaning, either essentially to one and the same position or to two or more positions.

FIG. 3 also illustrates as another preferred embodiment of the invention how introduction of different thick stock components is arranged on different sides of the deaeration. However, it is not necessary to act in this way, but it is also possible to arrange the deaeration either for white water WW only, for white water WW and one or more gaseous thick stock components (shown in FIG. 3) fed thereinto, or for white water WW and all thick stock components mixed thereinto.

FIG. 4 illustrates a preferred embodiment of the present invention, showing how it is possible to use one or more thick stock components as an injection liquid for one or more additives. As additives to be fed together with stock components, FIG. 4 shows feeding of additive F, carbon dioxide ($CO_2$) and milk of lime (MoL) to the main stock line. In the embodiment according to FIG. 4, the filler F is introduced into the main stock line 100 together with a thick stock component (S2), for example, by using the thick stock component as an injection liquid. A thick stock component (S2) applicable for use in the described injection position is broke fraction. In the embodiment of the Fig., injection is effected prior to the wire pit, although it is possible to feed the filler together with the stock component also in some other appropriate position. In the embodiment of FIG. 4, carbon dioxide is introduced by means of a thick stock component S6 to the pressure side of the headbox feed pump so that preferably it has time to dissolve in the fiber stock before the milk of lime (MoL) is injected together with the following thick stock component S7 between the headbox screen and the headbox. In the above-mentioned positions, the thick stock component may be short fibre or long fibre pulp, recycled pulp, and also thermomechanical pulp (TMP) is applicable. The carbon dioxide and the milk of lime can naturally be introduced also into earlier stages of the process and also so that both of them need not be injected into the fiber stock, using a thick stock component as an injection liquid, but also other appropriate manners of mixing or injection liquids may be used. Injection with a thick stock component can optionally also be implemented by using a side flow separated from the main stock line 100 as an injection liquid for either one or both of the chemicals.

FIG. 5 illustrates an embodiment in which, in the same way as hereinabove, carbon dioxide ($CO_2$) and milk of lime (MoL) are introduced very close to the headbox feed pump, by using thick stock components S5 and S6. The thick stock component S7, which is in this embodiment fine fraction from the fiber recovery filter and is already both gasfree and very fine material by nature, thereby not being necessary to be screened in the vortex cleaning devices or in the headbox screen or to be treated in the deaeration device, is injected very close to the headbox. In accordance with this embodiment of the invention, it is advantageous to use said thick stock component for the injection of retention aid into the fiber stock. This is naturally beneficial because this fine fraction in particular calls for use of retention aid in order to gain retention on the wire, and feeding them together brings the fines and retention aid into communication with each other. On the other hand, thinking about it more extensively, because the amount of fines to be fed as a thick stock component is relatively small, it is advantageous to feed the fines fraction together with some other feed component, in which case this other component may finally determine the actual feeding position. Thus, the fines fraction of the fiber recovery may be injected also prior to the deaeration device and/or the vortex cleaning device, either alone or together with a retention aid or some other additive used in papermaking. In the same way, it can also be injected together with some other thick stock component.

FIG. 6 illustrates a preferred embodiment of the present invention, showing how it is possible to mix an additive or chemical C into a predetermined thick stock component S6 before said stock component S6 is injected into the short circulation of the paper machine. The Fig. shows addition of said chemical C to the thick stock component by injection, although also other modes of addition and mixing are applicable. The issue can also be seen more extensively and say that the mixing of an additive or chemical into a stock component is effected before mixing of the stock component into the dilution water or so-called main stock flow. Chemicals C suitable for being mixed in this manner are, for example, starch, sizing agent, fixative and milk of lime (MoL). As a preferred embodiment we can mention an option, also shown in the Fig., that if milk of lime (MoL) is mixed beforehand into the thick stock component and injected together with it into the short circulation, which has already earlier been provided with carbon dioxide ($CO_2$), for example, together with the thick stock component S5, the crystals (PCC) thereby formed will thicken more strongly on the fibers of said thick stock component, on both the outer and inner surfaces of the fibres.

FIG. 6 also illustrates another preferred embodiment, showing how retention aid consisting of two components is introduced into the main stock flow 100. The first retention aid component Ret1 is injected to the main stock flow 100 together with a thick stock component S4 before the headbox feed pump 24, in which case the chemical Ret1 is preferably of type which endures shearing forces well. Another retention aid component Ret2 is injected together with a thick stock component S7 not until after the headbox screen 26, in which case said component Ret2 can be of a type which endures shearing forces very poorly. Naturally it is possible to inject one of the retention aids also between the headbox feed pump and headbox screen, either as such or with some thick stock component.

FIG. 7 illustrates still some ways, slightly different from the previous ones, for adding both thick stock components and additives needed for the forming of the fiber web to the short circulation of the fiber web machine. In connection with the thick stock component S2, there is disclosed a possibility of mixing a first additive A1 into the thick stock component S2 before it is injected as an injection liquid of a second additive A2. It is possible to mix the first additive A1 into the thick stock component S2 either by injection as shown in FIG. 6 together with chemical C, such as milk of lime, or in a more conventional manner.

FIG. 7 also illustrates how a mechanical stock component S3 is used as an injection liquid when fixative (Fix) is fed to the main stock flow 100. As said stock component S3 and chemical (Fix) are introduced as a pair, it is possible to fix disturbing substance, included in the mechanical stock, to fibres. In this example, it is not necessary either to effect injection just in this position, but one should take into consideration the earlier treatment of especially the thick stock component or, in practice, whether there is any need to treat the thick stock component by vortex cleaning devices and/or in the deaeration.

Furthermore, FIG. 7 illustrates use of the stock component S5 as an injection liquid of a wet strength sizing agent (WS), which can be for example ASA or AKD. In this example, it is assumed that the stock component S5 already been vortex cleaned in its own manufacture. If not, then said pair should be injected into the main stock flow prior to the vortex cleaning 20.

In addition to the examples described above, it has to be noted as regards the injection of chemicals, that the present invention provides extensive possibilities to fit the injection of different papermaking chemicals in exactly the point of the process which is optimal regarding the whole. Although the TrumpJet® technology earlier enabled feeding of the chemicals themselves at any point of the process, i.e. positioning of the chemicals feed at a certain point in view of various process equipment, the present invention essentially improves the possibilities of feeding the chemicals. This is because now it is possible to feed the chemical to a correct point also in view of different thick stock fractions. In other words, always when feeding of a chemical or thick stock component either together or in a certain order is seen advantageous, this can be taken into consideration when building the process. Examples of these are strength starch, short circulation chemical or additive, filler and fines. By selecting the optimal additive and stock component, we can influence on that said additive reacts more strongly just with the injection stock used. It is also possible to arrange different retentions between the feedings of both chemicals and thick stock components, if necessary.

By exploiting the present invention it is possible to introduce various types of retention aids and sizing agents together with thick stock components into various positions of the short circulation of a paper machine. An advantage is that the feeding is effected by using pairs of thick stock chemicals, resulting in that it is possible to optimize, among other things, web formation, sizing and types of flocks.

Mixing by injection in accordance with the invention also enables the mixing of a thick stock component either before the mixing pump of the short circulation to an open atmospheric space or after the pump to a pressurized space. In other words, mixing by injection provides clearly more diverse possibilities in comparison with prior art to mix thick stock components into exactly those positions in which the feeding of said component brings some advantage with it.

The technique is applicable for example in such a manner that the position and the proportioning order of stock fractions and the selection of suitable additive needed in the process in that particular position make it possible to influence on the structures of flocks and the bonding of fines, and the additives can be directed per stock fraction and thereby have an effect on the dewatering, formation, cleanliness, efficiency of chemicals, sizing result, opacity, printability etc.

It is to be noted regarding the description hereinabove that the term paper machine used in the description has to be understood very extensively, whereby all such fiber web machines are counted in which the fiber stock to be formed as a web is composed of a plurality of thick stock components. In other words, besides conventional paper machines also at least board and tissue machines are to be counted. Further, it is to be noted regarding the embodiments disclosed hereinabove that they describe only preferred exemplary options for introducing various chemicals and additives. Thus, it is clear that the examples hereinabove do not cover all possible options for the introduction of various additives and chemicals. It is also to be understood that in connection with each embodiment disclosed hereinabove, it is possible to additionally introduce some additive or chemical not disclosed in the embodiment, together with some thick stock component or in some other suitable manner. It is further to be understood that, unless explicitly emphasized hereinabove that some chemicals or additives or thick stock components are a pair bound together, such as carbon dioxide and milk of lime, single chemicals and additives have to be taken as separate examples and not bind them to other chemicals or additives described in connection with the same embodiment.

The invention claimed is:

1. A method of proportioning thick stock components to a short circulation of a fiber web machine, which comprises:
    (a) providing the fiber web machine with a short circulation comprising a main stock line between a wire pit and a headbox of the fiber web machine, and at least one of a vortex cleaning plant, a deaeration tank, a headbox feed pump, and a headbox screen arranged along the main stock line;
    (b) introducing at least white water originating from the fiber web machine into the main stock line, and
    (c) introducing a thick stock component into the main stock line to form together with the white water a main stock flow, and
    (d) injecting at least one thick stock component into the main stock flow in a direction substantially transverse to the direction of the main stock flow, and at a substantially higher velocity than that of the main stock flow.

2. The method as recited in claim 1, wherein step (d) is practiced by injecting said thick stock component together with at least one filler, additive, or chemical for influencing at least one of flock structures, bonding of fines, dewatering, web formation, cleanliness, effect of chemicals, sizing result, opacity, and printability.

3. The method as recited in claim 1, wherein each thick stock component injected into the main stock line has a consistency during injection which is higher than a consistency of the main stock flow at a point of injection of the thick stock component.

4. The method as recited in claim 1, wherein step (c) comprises introducing carbon dioxide into the main stock flow together with a first thick stock component, and thereafter introducing milk of lime into the main stock flow together with a second thick stock component on surfaces of which formation of crystals is desired.

5. The method as recited in claim 4, wherein the first and second thick stock components with which the carbon dioxide and the milk of lime are introduced are two of short fiber pulp, long fiber pulp, recycled pulp and thermomechanical pulp (TMP).

6. The method as recited in claim 4, wherein step (c) comprises introducing the carbon dioxide and the milk of lime into the main stock line close to the headbox feed pump.

7. The method as recited in claim 1, which comprises introducing a fine fiber fraction from fiber recovery into the main stock flow close to the headbox after the headbox screen.

8. The method as recited in claim 7, wherein the fine fiber fraction from fiber recovery is introduced into the main stock flow together with retention aid.

9. The method as recited in claim 7, wherein the fine fiber fraction from fiber recovery is introduced into the main stock flow together with a thick stock component.

10. The method as recited in claim 7, wherein the retention aid comprises two retention aid components, and wherein the method comprises introducing a first one of the retention aid components into the main stock flow together with a thick stock component before a headbox screen, and introducing a second one of the retention aid components together with another thick stock component into the main stock flow after the headbox screen.

11. The method as recited in claim 1, further comprising introducing a fixative into the main stock flow together with a mechanical stock component for fixing disturbing substances included in the mechanical stock to the fibers.

12. The method as recited in claim 1, further comprising introducing a dilution liquid into the main stock flow together with a thick stock component.

13. The method as recited in claim 1, further comprising introducing a filler into the main stock flow together with broke.

14. The method as recited in claim 1, further comprising introducing at least one of a filler, an additive, or a chemical needed in the manufacture of the fiber web into a thick stock component prior to introducing the thick stock component into the main stock flow.

15. The method as recited in claim 1, further comprising injecting a wet strength sizing agent together with a thick stock component including chemical pulp.

16. The method as recited in claim 1, further comprising injecting at least one of a filler, an additive, or another chemical into the main stock line by using at least a part of said thick stock component as a feeding liquid.

17. The method as recited in claim 1, wherein a feed rate of the thick stock component is substantially higher than a flow rate of the main stock flow.

* * * * *